Feb. 16, 1965

V. BOXER 3,170,123

TUNNEL DIODE OSCILLATOR

Filed July 6, 1961

INVENTOR,
VICTOR BOXER.

BY Jack H. Linscott

ATTORNEY 3,170,123

TUNNEL DIODE OSCILLATOR

Victor Boxer, Belmar, N.J., assignor to the United States of America as represented by the Secretary of the Army Filed July 6, 1961, Ser. No. 122,359
5 Claims. (Cl. 331—107)
(Granted under Title 35, U.S. Code (1952), sec. 266)

The invention described herein may be manufactured and used by or for the Government for governmental purposes, without the payment of any royalty thereon.

This invention relates to oscillators and particularly to non-sinusoidal oscillators. More particularly, this invention relates to very-sharp-pulse-generating oscillators.

The prior art includes many oscillators that can produce, or can be adapted to produce, sharp pulses. These include blocking oscillators, relaxation oscillators, multivibrators, and variations of sine wave oscillators.

Some of the circuits, such a blocking oscillators, do inherently produce sharp pulses, but their pulses are characterized by over-shoot of the voltage and a damped train of oscillations. In addition, special devices such as phased, multiple-winding transformers, are necessary for effective operation of these circuits. The circuits that produce angular or rectangular wave forms may be adapted to produce sharp pulses, but this usually requires additional circuitry for differentiating and wave shaping. The circuits that produce sine waves require additional clipping stages before the differentiating stages to produce sharp pulses.

The gaseous tube discharge circuits generally use resistances—instead of inductances—in combination with the condensers; operate only in the millisecond range; and require at least 70 volts at an appreciable amount of power for effective operation.

It is therefore an object of this invention to produce an improved pulse generator.

It is a further object of this invention to produce an improved pulse generator requiring a minimum of number of parts.

It is a further object of this invention to produce an improved low voltage pulse generator requiring a minimum of power.

It is a further object of this invention to produce an improved pulse generator adaptable to micro-miniaturization.

It is a further object of this invention to produce an improved pulse generator capable of withstanding extreme mechanical shock in any direction.

It is a further object of this invention to produce an improved pulse generator having very stable characteristics.

It is a further object of this invention to produce an improved pulse generator that operates in the millimicrosecond range of pulse width.

It is a further object of this invention to produce an improved pulse generator that operates as a current device rather than a voltage device.

These and other objects are accomplished by connecting a tunnel diode in series with a saturable reactor and a source of voltage having a very low internal resistance. The stray capacitance of the tunnel diode is charged by the source of voltage, through the saturable reactor which appears as a high impedance at low current conditions and as a low impedance at high current conditions.

This invention will be better understood and other and further objects of this invention will become apparent from the following specification and the drawings, of which:

Figure 1:
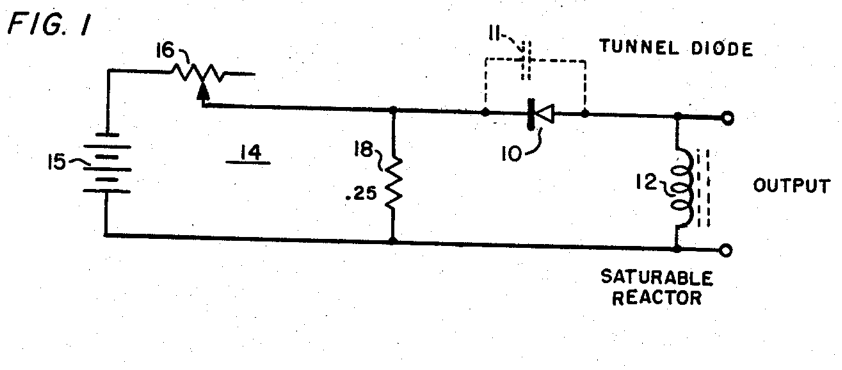
FIGURE 1 is the circuit diagram of a preferred embodiment of this invention.

Referring now more particularly to FIGURE 1, a tunnel diode 10 is connected in series with the saturable reactor 12 and the power supply 14. The power supply consists of the battery 15; the variable resistor 16, which is also connected in series with the elements 10 and 12, but serves only to control the voltage of the power supply 14 that is applied to those elements; and the resistor 18 which is connected across the power supply, and reduces the effective source resistance of the power supply to the value required for energizing the tunnel diode.

The capacitance 11, shown in dotted lines connected across the tunnel diode 10, represents the capacitance of the diode as it effects the operation of the circuit.

Figure 2:
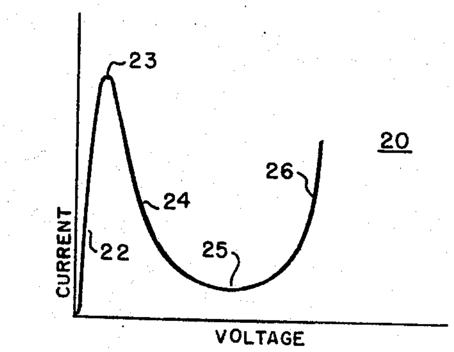
FIGURE 2 shows the characteristic curve of a typical tunnel diode as applied in this invention.

FIGURE 2 is basically the characteristic curve 20, of current with respect to voltage, of a conventional tunnel diode. The negative resistance region of the characteristic curve, that is essential to the operation of this invention is seen in the reversing slope 24 between the peak point 23 and the valley point 25 of the curve 20.

Figure 3:
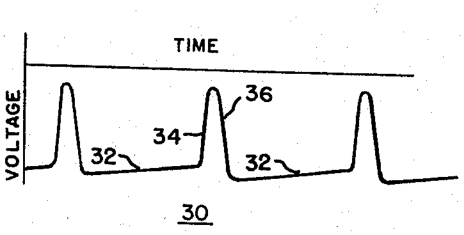
FIGURE 3 shows a typical wave form produced by the circuit of FIGURE 1.

FIGURE 3 shows the wave form 30 of the circuit of FIGURE 1 under normal conditions of operation. This wave form includes the three distinct portions 32, 34, and 36 which represent three phases of the operation of this circuit. It is believed that the operation of these three phases of the output voltage curve may be explained in the manner set forth below.

The power supply 14 provides a voltage which starts to charge the capacitance 11, across the diode 10, through the saturable reactor 12. During this initial charging phase of the pulse generating cycle, the diode appears as a relatively high resistance with a substantially linear voltage-current relationship, such as that shown in the section 22 of the curve 20 of FIGURE 2.

The current flow during this phase includes the amount drawn by the charging of the capacitance 11, and is less than the amount needed to saturate the saturable reactor 12. During this phase, the reactor presents a high impedance to the flow of current and holds the charging current through the diode and the capacitance to a low rate of increase. The output voltage during this interval actually decreases, as seen in the portion 32 of the wave form 30 of FIGURE 3 even though the current is increasing. This is due to the fact that the voltage across the diode is increasing, as seen in the portion 22 of the characteristic curve.

The reactor 12 is designed to saturate at a very low current, and as soon as this current is reached, the impedance of the reactor becomes negligible and the output voltage decreases abruptly as seen in the portion 34 of the wave form 30 of FIGURE 3. At this point, the opposition to the flow of the current is greatly reduced and the charging current to the capacitance and the diode assumes the high rate, further increasing the voltage across the diode, as must follow from the characteristic curve of FIGURE 2.

During this interval, the voltage across the diode and the current through the diode are increasing linearly and still follow the linear section 22 of the characteristic curve 20 of FIGURE 2. However, the current and voltage soon reach the point where the increase in voltage, toward the level established by the power supply, causes a decrease in the current through the diode, as seen in the section 24 of the curve 20 of FIGURE 2. This decrease in current unsaturates the saturable reactor, which again presents a high impedance to the flow of the current from the power supply, and no appreciable current will flow through the reactor until the voltage across the capacitance is discharged through the diode and the cycle begins again. This last phase of the cycle is illustrated by the portion 36 of the wave form 30 of FIGURE 3 and is accompanied by the steep increase in output voltage.

There are certain variations of this circuit that will be obvious to anyone skilled in the art and that are well within the teachings of this invention. For example, the power supply 14 may be replaced by any well known source of direct current, and, if the correct voltage is available at a low enough source impedance, the resistors 16 and 18 may be eliminated. Several types of "Esaki" or tunnel diodes, are also useable here, and the capacity of the diodes may be varied internally or externally, as by adding a condenser in parallel, in a well known manner. The saturable reactor also may be replaced by any available saturable reactor having the same, or equivalent, characteristics.

The tunnel diode actually used here was a type 1N2939, manufactured by the General Electric Company; the saturable reactor consisted of 12 turns of number 26 "formex" enameled wire, also made by the General Electric Company, wound on a foramic H core of ⅛ inch cross section and ½ inch diameter, made by the General Ceramics Company of Keasby, N.J. The resistors 16 and 18 are 10 ohms and ¼ ohms respectively and the battery 15 is 1.5 volts.

What is claimed is:

1. A pulse generator comprising a source of direct current, a tunnel diode and a saturable reactor connected in series.

2. A pulse generator as in claim 1 wherein said tunnel diode has a substantial internal capacity.

3. A pulse generator as in claim 1 wherein said tunnel diode has a given peak current rating, said source of direct current is sufficient to supply said given peak current, and said reactor is saturable by less current than said given peak current.

4. A pulse generator as in claim 1 wherein said source of current comprises a battery; a variable, current-controlling resistor connected in series with said battery; and a source-impedance-reducing resistor connected across the series combination of said battery and said variable resistor.

5. A self-oscillating pulse generator comprising, a source of direct current including a battery and a variable resistor connected in series, a fixed resistor connected in parallel with said source of current, a tunnel diode having a substantial internal capacity, a saturable reactor connected in series with said tunnel diode across said fixed resistor, and a pair of output terminals connected across said saturable reactor.

References Cited by the Examiner

UNITED STATES PATENTS

| | | | |
|---|---|---|---|
| 3,054,070 | 9/62 | Rutz | 331—107 |
| 3,070,708 | 12/62 | Dill | 307—88.5 |
| 3,076,944 | 2/63 | Watters | 307—88.5 |
| 3,106,649 | 10/63 | Johnston | 307—88.5 |

OTHER REFERENCES

Electrical Engineering, April 1960, pages 245 and 270–277.

ROY LAKE, *Primary Examiner.*

JOHN KOMINSKI, *Examiner.*